US012020886B2

(12) United States Patent
Vasilev et al.

(10) Patent No.: US 12,020,886 B2
(45) Date of Patent: Jun. 25, 2024

(54) CONTACT UNIT AND CONTACT SYSTEM FOR AN ON-LOAD TAP CHANGER AND ON-LOAD TAP CHANGER

(71) Applicant: Hitachi Energy Ltd, Zürich (CH)

(72) Inventors: Borislav Vasilev, Sofia (BG); Georgi Manev, Sofia (BG); Todor Kokev, Sofia (BG); Angel Mihaylov, Plovdiv (BG)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/236,693

(22) Filed: Aug. 22, 2023

(65) Prior Publication Data

US 2023/0395333 A1 Dec. 7, 2023

Related U.S. Application Data

(63) Continuation of application No. 18/032,635, filed as application No. PCT/EP2022/050539 on Jan. 12, 2022.

(30) Foreign Application Priority Data

Feb. 16, 2021 (EP) .................................... 21157407

(51) Int. Cl.
*H01H 9/00* (2006.01)
*H01H 1/44* (2006.01)
(Continued)

(52) U.S. Cl.
CPC ............ *H01H 9/0016* (2013.01); *H01H 1/44* (2013.01); *H01H 1/50* (2013.01); *H01H 1/16* (2013.01)

(58) Field of Classification Search
None
See application file for complete search history.

(56) References Cited

U.S. PATENT DOCUMENTS 5,396,036 A * 3/1995 Yoshida ............... H01H 9/0016 200/290
6,331,687 B1 * 12/2001 Dunk ................. H01H 11/0062 361/45
(Continued)

FOREIGN PATENT DOCUMENTS

CN 2182448 Y 11/1994
DE 1891475 U 4/1964
(Continued)

OTHER PUBLICATIONS

International Search Report and Written Opinion of the International Searching Authority, PCT/EP2022/050539, mailed May 6, 2023, 16 pages.
(Continued)

*Primary Examiner* — Felix O Figueroa
(74) *Attorney, Agent, or Firm* — Sage Patent Group

(57) ABSTRACT

A contact unit for an on-load tap changer includes a connector body and a contact holder coupled to each other, wherein the connector body is configured to connect the contact holder to a contact of the on-load tap changer. The contact unit further includes a contact element coupled to the contact holder and configured to make electrical contact to a contact element of a contact device for the on-load tap changer. The contact unit further includes drive and guiding features coupled to the contact holder such that the contact element is movable driven and linearly guided in a direction away from the connector body.

19 Claims, 4 Drawing Sheets

(51) Int. Cl.
*H01H 1/50* (2006.01)
*H01H 1/16* (2006.01)

(56) References Cited

U.S. PATENT DOCUMENTS

| | | | | |
|---|---|---|---|---|
| 8,317,397 | B2 * | 11/2012 | Klein | F16C 29/069 384/49 |
| 8,993,904 | B2 * | 3/2015 | Elick | H01H 19/12 200/11 TC |
| 9,208,974 | B2 * | 12/2015 | Liu | H01H 9/0016 |
| 9,351,898 | B2 * | 5/2016 | Triolo | A61H 3/04 |
| 9,375,840 | B2 * | 6/2016 | Naderer | B25J 9/1687 |
| 9,583,284 | B2 * | 2/2017 | Kim | H01H 9/0016 |
| 9,793,067 | B2 * | 10/2017 | Muenzberg | H01H 9/0016 |
| 2003/0102205 | A1 | 6/2003 | Baertl et al. | |

FOREIGN PATENT DOCUMENTS

| | | | |
|---|---|---|---|
| EP | 0399486 | A2 | 11/1990 |
| EP | 0577963 | A1 | 1/1994 |
| WO | 2017036496 | A1 | 3/2017 |

OTHER PUBLICATIONS

International Preliminary Report on Patentability, PCT/EP2022/050539, mailed Jan. 26, 2023, 63 pages.

* cited by examiner

CONTACT UNIT AND CONTACT SYSTEM FOR AN ON-LOAD TAP CHANGER AND ON-LOAD TAP CHANGER

CROSS REFERENCE TO RELATED APPLICATIONS

This application is a continuation of U.S. application Ser. No. 18/032,635, filed Jun. 16, 2023 which is a 35 U.S.C. § 371 national stage application of PCT International Application No. PCT/EP2022/050539 filed on Jan. 12, 2022, which in turn claims priority to European Patent Application No. 21157407.4, filed on Feb. 16, 2021, the disclosures and content of which are incorporated by reference herein in their entireties.

TECHNICAL FIELD

The present disclosure is related to a contact unit and a contact system for an on-load tap changer. The present disclosure is further related to a corresponding on-load tap changer.

BACKGROUND

Tap changers realize a mechanism in transformers which allows for variable turn ratios to be selected in distinct steps, for example. In view of movable and stationary electrically engaging contacts it is a challenge to provide a stable and reliable mechanism with low wear and stress.

SUMMARY

Thus, it is an object to provide a contact unit and contact system for an on-load tap changer that allows for a stable and reliable mechanism and contributes to low wear and stress of interacting components.

According to an embodiment, a contact unit for an on-load tap changer comprises a connector body and a contact holder coupled to each other, wherein the connector body is configured to connect the contact holder to a contact of the on-load tap changer. The contact unit further comprises a contact element coupled to the contact holder and configured to make electrical contact to a contact element of a contact device for the on-load tap changer. The contact unit further comprises drive and guiding means coupled to the contact holder such that the contact element is movable driven and linearly guided in a direction away from the connector body. The drive and guiding means comprise at least one linear bearing and an axis arranged inside the bearing which are configured to provide linearly guided movement of the contact element of the contact unit. The contact unit further comprises a further contact holder, a further contact element and further drive and guiding means assembled as the aforementioned ones to enable secure electrical engagement with the contact element of the contact device due to two or more contact element of the contact unit. The contact holders, the contact elements and the corresponding drive and guiding means are coupled to the connector body such that the directions the corresponding contact elements are movable along enclose a predetermined angle.

By use of the described contact unit a linearly guided contact system for an on-load tap changer is feasible at low cost and allows for secure and reliable functioning. The contact unit may realize a movable contact which is configured to interact with a corresponding stationary contact to provide voltage transfer in a selector of a power diverter switch for an on-load tap changer. The described configuration may enable to provide electrical contact for voltage transfer at an upper and/or a lower position of the corresponding contact element of a contact device. Thus, a secure interaction between the contact elements can be set up which also allows for freedom of movement to a certain extent and which can further contribute to low wear and reduced mechanical stress during an engagement processes.

It is a recognition of the present disclosure that usual designs for contact systems of selector mechanisms in column type on-load tap changers consists of one or several sets of current carrying contacts placed on a static holder or joint adjacent one to each other in an angle corresponding to the placement of the respective odd and even tap positions. Such a static system is usually defined around a rotational axis concentric to a main axis of an on-load tap changer. The so formed rotating lever mechanism causes force concentrations at an end of the mechanism, i.e., the engaging contacts, that leads to wear and stresses which are functionally bound to an overall stiffens of such a system. Moreover, conventional mechanisms usually may cause complexity and difficulty during an installation phase where in order to assemble the system several steps for alignment have to be fulfilled so that correct and secure contact engagement can be provided.

The described contact unit enables to counteract the aforementioned difficulties due to an implementation of a linearly guidance of the contact element, which allows for both the reduction of contact stress via an implementation of interacting contacts as well as for contacts retraction when assembled and engaged to corresponding fixed contacts.

According to an embodiment of the contact unit, the contact element comprises a rotatable roller to make electrical contact to a contact element of a contact device for the on-load tap changer. Using a rotatable and electrically conductive roller allows for reduced friction and contributes to low wear and stress with respect to engagement with corresponding contact elements of the contact device. Alternatively, or additionally, the contact element of the contact unit comprises a slider to make electrical contact to a corresponding contact element of a contact device.

According to a further embodiment, the drive and guiding means comprise a tensioned or biased spring configured to act as a spring force driving the contact element of the contact unit away from the connector body. Such a spring element realizes a simple and low-cost component to reliably provide a force pushing the contact element in the desired direction, towards a corresponding stationary contact element of a contact device, for example. Moreover, alternative or additional force acting elements may be used as well to act on the contact element of the contact unit.

The drive and guiding means comprise at least one linear bearing and an axis arranged inside the bearing which are configured to provide linearly guided movement of the contact element of the contact unit. In combination with the aforementioned spring element, a spring-loaded and linearly guided contact unit is feasible which causes a relative low friction and thus contributes to low wear and stress while enabling a reliable electrical contact engagement and secure current conduction and/or power transfer.

According to a further embodiment, the drive and guiding means comprise two or more linear bearings and corresponding axes arranged inside the associated bearing. The contact element of the contact unit is arranged between the bearings to provide a stable and reliably guided movement of the contact element towards a corresponding contact element of a contact device.

According to an embodiment, a contact system for an on-load tap changer comprises an embodiment of the described contact unit and a contact device with a contact terminal and a contact element configured to provide power supply due to engagement and interaction of the contact elements of the contact unit and the contact device. As a result of that the contact system comprises an embodiment of the contact unit as described above, features and characteristics of the contact unit are also disclosed with respect to the contact system and vice versa.

The contact unit may realize a moving contact arranged at a movable contact element of the contact system whereas the contact device may realize a stationary contact assembled at a predetermined position. Thus, due to movement of the contact unit towards the stationary contact device electrical engagement can be set up to enable power transfer. Alternatively, the contact unit may realize a positionally fixed contact whereas the contact device may be movably arranged such that an electrical engagement can be set up by movement of the contact device towards the contact unit. In general, the contact unit and the contact device of the contact system are configured to be movable relative to each other.

The contact device is configured in coordination with the contact unit to provide low friction and reduced mechanical stresses and to contribute to reliability, ease of assembly and even self-alignment of the interacting contact elements. For instances, the contact element of the contact device comprises a curved shape and extends along a ring section. Such a configuration can be beneficial with respect to a movable contact unit moving along a respective a circular path.

According to a further embodiment, the contact elements of the contact unit and the contact device comprise a respective contact surface configured to face each other along the direction the contact element of the contact unit is movable.

According to an embodiment, an on-load tap changer for setting a gear ratio comprises a rotatable contact ring, and an embodiment of the aforementioned contact system including the contact unit and the contact device. The contact device is configured stationary and the contact unit is connected to the rotatable contact ring and thus configured movable. The contact element of the contact unit is driven and linearly guided in the direction away from the connector body and towards the stationary contact element of the contact device.

As a result of that the on-load tap changer comprises an embodiment of the contact system as described above, features and characteristics of the contact system and the contact unit as well as the contact device are also disclosed with respect to the on-load tap changer and vice versa.

BRIEF DESCRIPTION OF THE DRAWINGS

Exemplary embodiments are explained in the following with the aid of schematic drawings and reference numbers. In the drawings.

The accompanying figures are included to provide a further understanding. Identical reference numbers designate elements or components with identical functions. In so far as elements or components correspond to one another in terms of their function in different figures, the description thereof is not repeated for each of the following figures. For the sake of clarity elements might not appear with corresponding reference symbols in all figures possibly.

DETAILED DESCRIPTION

Figure 1:
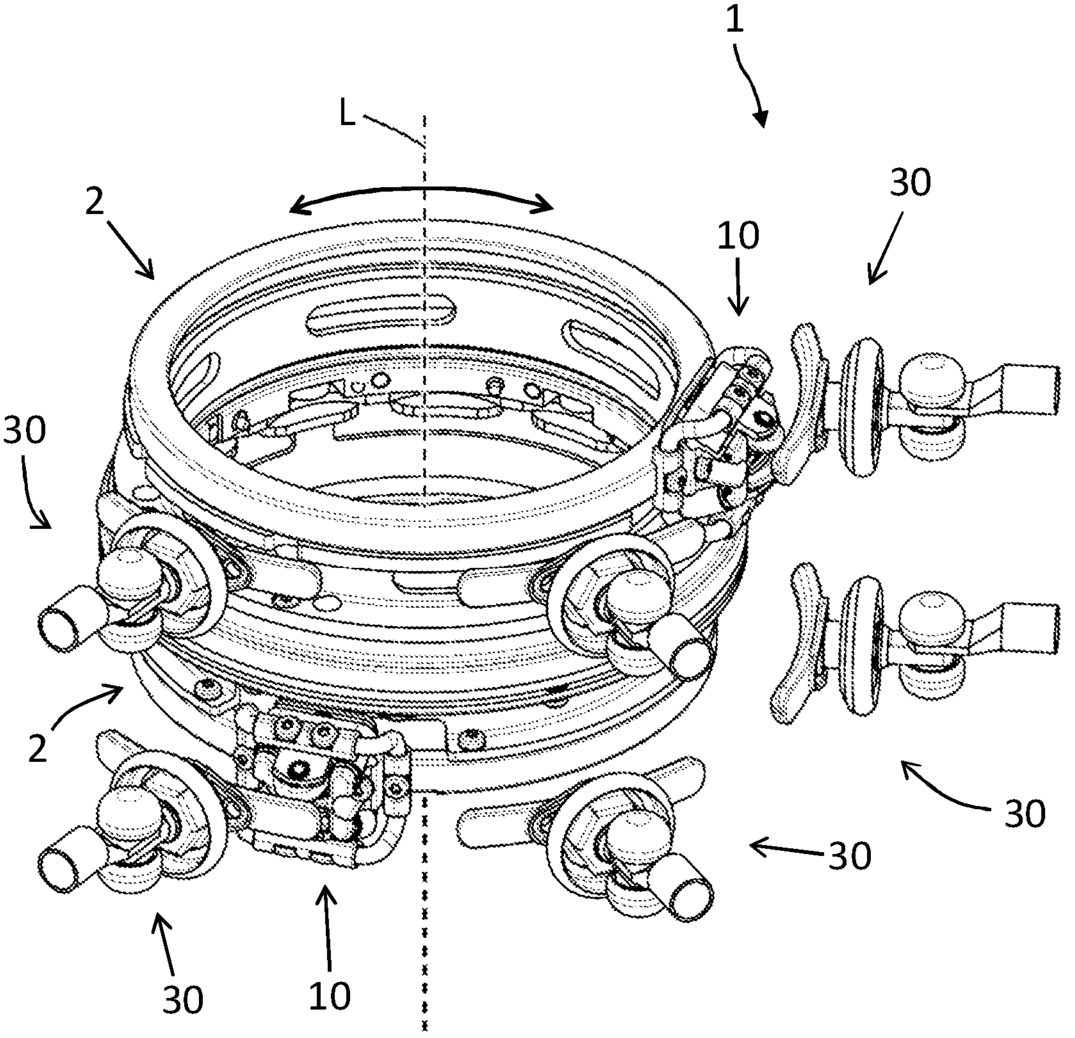
FIG. 1 illustrates an exemplary embodiment of a contact system for an on-load tap changer.
Figure 3:
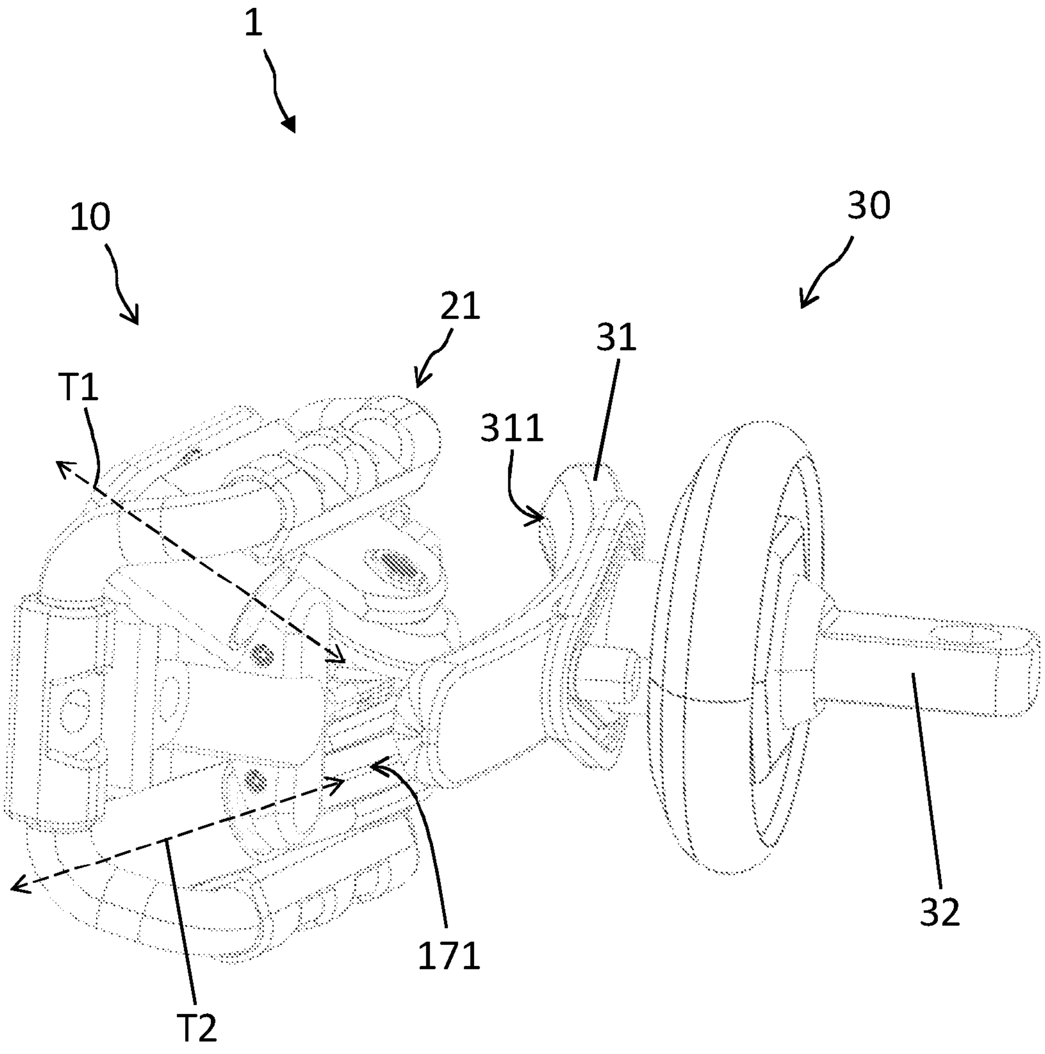
FIG. 3 illustrates the contact system of FIG. 1 in a perspective view.

FIG. 1 illustrates a perspective view of components for an on-load tap changer for a transformer which allows for variable turn ratios to be selected in distinct steps without a supply interruption during a tap change. The on-load tap changer comprises one or more rotatable contact rings 2 movable with respect to a longitudinal axis L configured to enable tap change and power transfer. The on-load tap changer further comprises a plurality of contact units 10 and contact devices 30 configured and arranged in coordination with each other to enable power transfer due to engagement of corresponding electrical contact elements 17 and 31 (see also FIG. 3).

One contact unit 10 and a corresponding contact device 30 realize a contact system 1 for the on-load tap changer. With respect to the embodiment shown in FIG. 1 there is a respective contact unit 10 arranged to a corresponding contact ring 2 via a contact body 11 of the contact unit 10. Due to its arrangement at the rotatable ring 2 the contact unit 10 realizes a movable contact whereas the contact devices 30 realize stationary contacts fixed in position. Thus, due to rotation of one of the contact rings 2 the correspondingly arranged contact unit 10 is rotated as well towards one of the contact devices 30 to electrically engage the contact elements 17 and 31.

Figure 2:
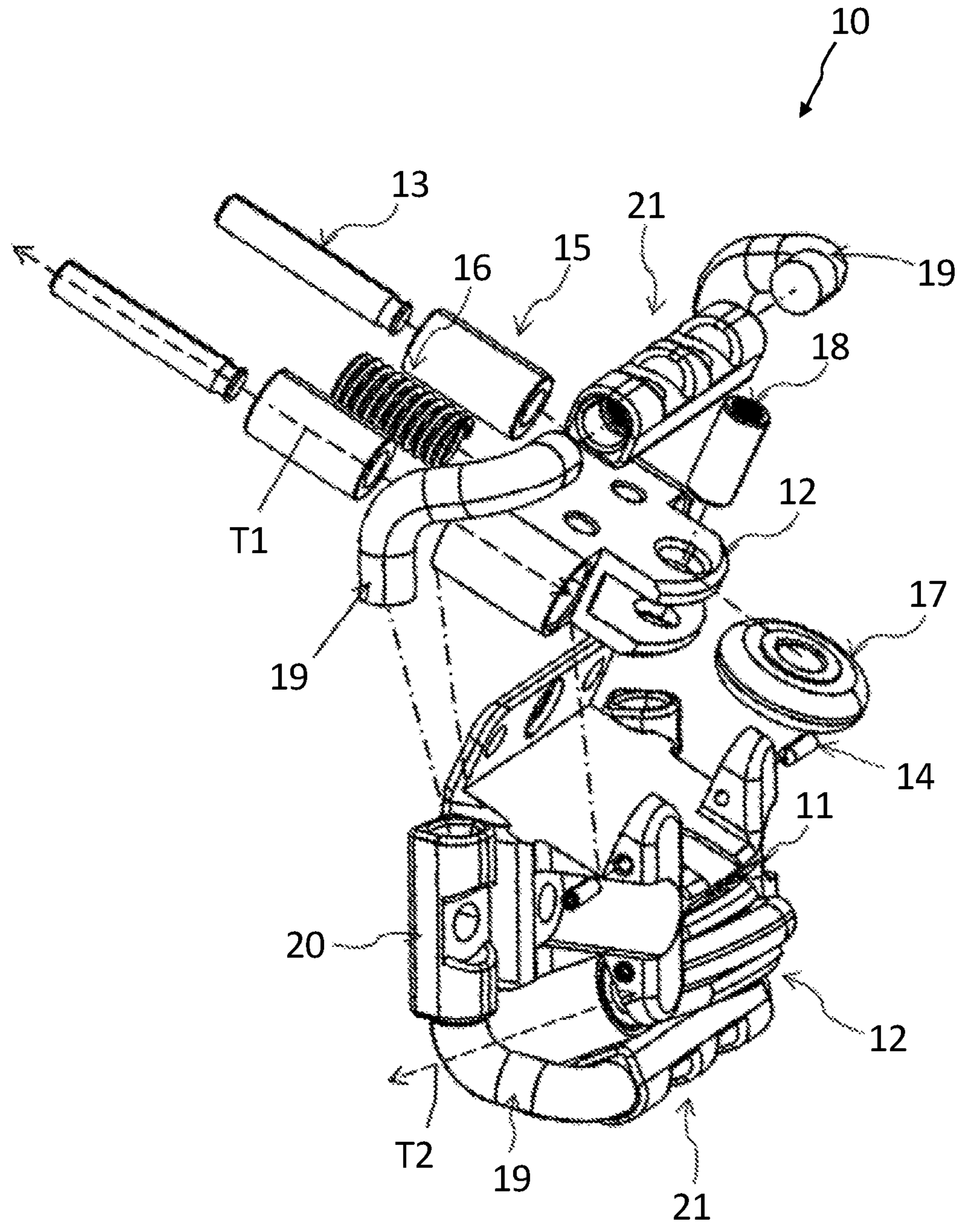
FIG. 2 illustrates an exemplary embodiment of a contact unit of the contact system.

FIG. 2 shows a perspective view of components of the contact unit 10 and its assembly options. The contact unit 10 comprises the connector body 11 and two contact holders 12 coupled to each other. The connector body 11 is configured to connect the contact holders 12 and to connect the contact unit 10 to the contact ring of the on-load tap changer. The contact unit 10 further comprises two contact elements 17 which are formed as electrical rollers belonging to the respective contact holder 12. The contact element 17 are coupled to the contact holder 12 fixed but rotatable due to an axis 18. The contact element 17 of the contact unit 10 is configured to make electrical contact to a corresponding contact element 31 of the contact device 30 which further comprises an electrical contact terminal 32 (see FIG. 3).

The contact unit 10 further comprises drive and guiding means for each contact holder 12. The respective drive and guiding means include two linear ball or sliding bearings 15, two axes 13 and a spring 16 coupled to the contact holder 12 such that the respective contact element 17 is spring-loaded and movable driven and linearly guided in a corresponding direction T1 or T2 away from the connector body 11 and towards the contact element 31 of the stationary contact device 30.

The contact body 11 realizes a main block which connects the two roller contact holders 12 by means of the axes 13 and locking elements 14 formed as locking screws, for example. The linear movement of the respective contact holder 12 along its associated direction T1 or T2 is provided by the linear ball bearings 15 and retaining motion/force is applied by the inserted spring 16. The roller contact element 17 comprises a contact surface 171 configured to contact a corresponding contact surface 311 of the contact element 31 of the contact device 30.

Figure 4:
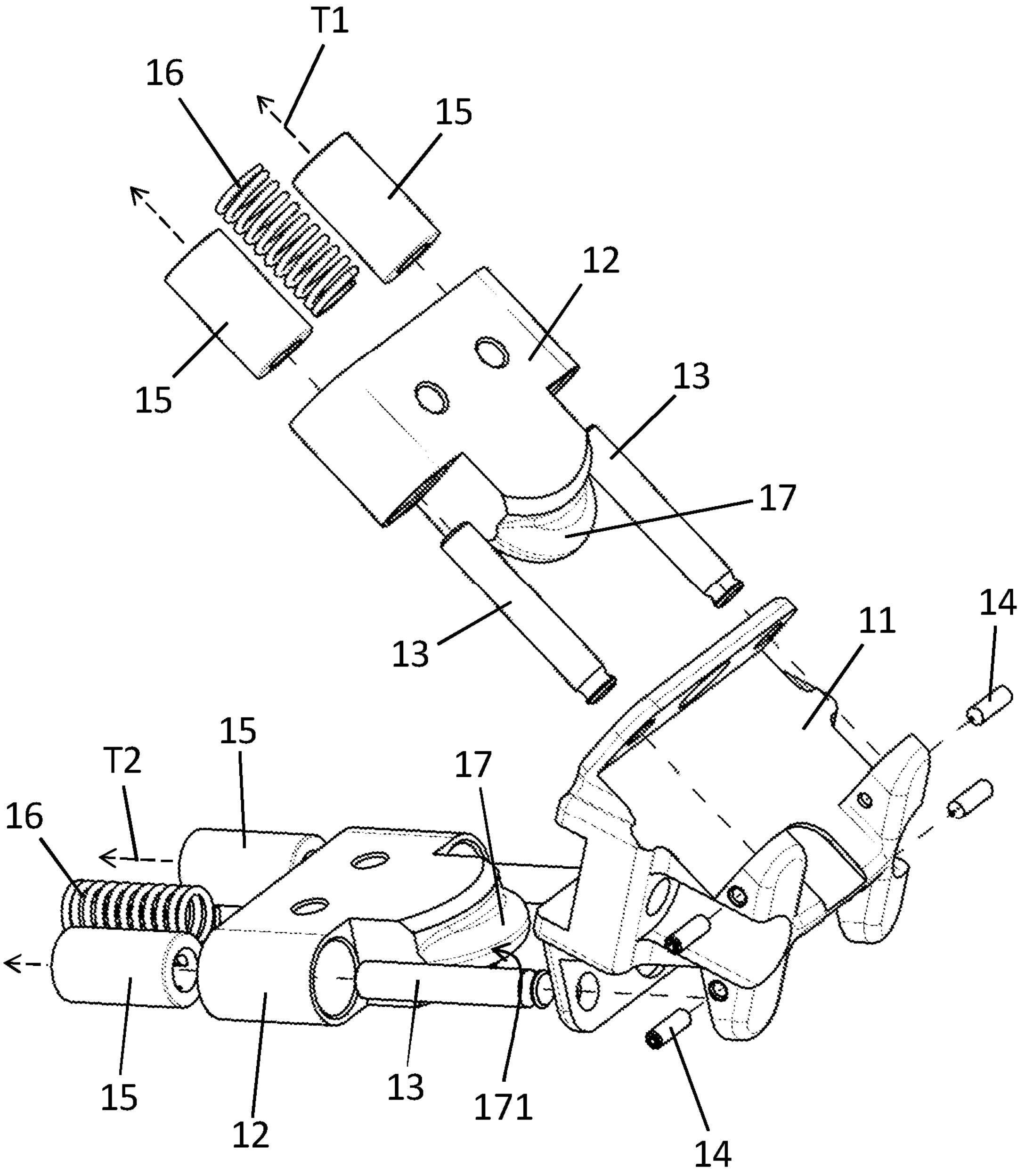
FIG. 4 illustrates an embodiment of components of the contact unit of the contact system.

The electrical contact between the contact device 30 and a selector contact 21 of the contact unit 10 is provided due to contact of the contacting surfaces 171, 311 between the fixed contact element 31 and the movable selector contact element 17. This is achieved via the contact element 17 which is realized as a rotatable roller with respect to the embodiment as illustrated in FIG. 2. Alternatively, according to an embodiment the contact element 17 can be realized as a non-rotatable slider as shown in FIG. 4. Both, the roller or the slider comprise a curved shape configured in coordination with the curved shape of the contact element 31 of the contact device 30. This enables a secure and reliable electrical engagement of the contact element 17 and 31 with low friction and low mechanical stress, respectively.

The contact element 17 is retained in its place due to the axis 18. Current is evenly distributed via flexible connections 19 and connection terminals 20. When force is applied to the roller or slider contact element 17 the contact holders 12 translate via their axes 13 and linear ball bearings 15 and the spring 16 deforms and the entire contact holder 12 retracts. This movement reduces overall wear on the roller or slider contact element 17, friction is reduced between the fixed contact element 31 and the movable contact element 17 and linear guidance is applied due to the linear ball bearings 15.

The described linearly guided roller/slider contact system 1 realizes a carrier of movable contacts in a selector of the on-load tap changer and allows for a stable and reliable mechanism of electrical engagement and power transfer and contributes to low wear and mechanical stress of the interacting components. The retractability of the contact system 1 enables an easier engagement and self-adjustment during assembly and operation as well.

The embodiments shown in FIGS. 1 to 4 as stated represent exemplary embodiments of an improved contact system 1 for an on-load tap changer; therefore, they do not constitute a complete list of all embodiments according to possible arrangements. Actual arrangements of the contact unit 10, the contact device 30 and/or the contact system 1 may vary from the embodiments shown in the figures.

REFERENCE SIGNS

1 contact system
2 contact ring
movable contact unit
11 connector body
12 contact holder
13 axis
14 locking element
linear ball bearing
16 spring
17 contact element of the contact unit
171 contact surface
18 axis
19 connection
connection terminal
21 selector contact
stationary contact device
31 contact element
311 contact surface
32 contact terminal
L longitudinal axis of the contact rings
T1 direction of bearing translation
T2 direction of bearing translation

The invention claimed is:

1. Contact unit for an on-load tap changer, comprising:

a connector body and a first contact holder coupled to each other, wherein the connector body is configured to be connected to a rotatable contact ring and to connect the first contact holder to a contact of the on-load tap changer, a first contact element coupled to the first contact holder and configured to make electrical contact to a second contact element of a first contact device for the on-load tap changer, and first drive and guiding means coupled to the first contact holder such that the first contact element is movable driven and linearly guided in a first direction away from the connector body that is oblique to a radial direction of the contact ring, the first drive and guiding means comprising at least one linear ball bearing and an axis arranged inside the bearing configured to provide linearly guided movement of the first contact element of the contact unit;

a second contact holder coupled to the connector body, a third contact element coupled to the second contact holder and configured to make electrical contact to a fourth contact element of a second contact device for the on-load tap changer, and second drive and guiding means coupled to the second contact holder such that the third contact element is movable driven and linearly guided in a second direction away from the connector body that is oblique to the radial direction of the contact ring and that is oblique to the first direction, and the first and second contact holders, the first and third contact elements and the corresponding first and second drive and guiding means being coupled to the connector body such that the first and second directions the corresponding first and third contact elements are movable along enclose a predetermined angle.

2. Contact unit according to claim 1, wherein the first contact element of the contact unit comprises a rotatable roller to make electrical contact to the second contact element of the first contact device for the on-load tap changer.

3. Contact unit according to claim 1, wherein the first contact element of the contact unit comprises a slider to make electrical contact to the second contact element of the first contact device for the on-load tap changer.

4. Contact unit according to claim 1, wherein the first drive and guiding means comprise a spring configured to act a spring force driving the first contact element of the contact unit away from the connector body.

5. Contact unit according to claim 1, wherein the first drive and guiding means comprise a second linear bearing and a second axis arranged inside the second bearing and wherein the first contact element of the contact unit is arranged between the first and second bearings.

6. Contact system for an on-load tap changer, comprising:

a contact unit according to claim 1, and a contact device with a contact terminal and a fifth contact element configured to provide power supply due to interaction of the first and third contact elements of the first and second contact units and second and fourth contact elements of the first and second contact devices.

7. Contact system according to claim 6, wherein the second contact element of the first contact device comprises a curved shape and extends along a ring section.

8. Contact system according to claim 6, wherein the first contact element of the first contact unit and the second contact element of the first contact device each comprise a respective contact surface configured to face each other along the direction the first contact element of the first contact unit is movable.

9. The contact system according to claim 6, wherein the first contact element of the contact unit comprises a rotatable roller to make electrical contact to the second contact element of the first contact device for the on-load tap changer.

10. The contact system according to claim 6, wherein the first contact element of the contact unit comprises a slider to make electrical contact to the second contact element of the first contact device for the on-load tap changer.

11. The contact system according to claim 6, wherein the first drive and guiding means comprise a spring configured to act a spring force driving the first contact element of the contact unit away from the connector body.

12. The contact system according to claim 6, wherein the first drive and guiding means comprise a second linear bearing and a second axis arranged inside the second bearing and wherein the first contact element of the contact unit is arranged between the bearings.

13. On-load tap changer for setting a gear ratio, comprising:

a rotatable contact ring, and a contact system comprising:

a contact unit comprising:

a connector body and a first contact holder coupled to each other, wherein the connector body is configured to connect the first contact holder to a contact of the on-load tap changer, a first contact element coupled to the first contact holder and configured to make electrical contact to a second contact element of a first contact device for the on-load tap changer, and first drive and guiding means coupled to the first contact holder such that the first contact element is movable driven and linearly guided in a first direction away from the connector body that is oblique to a radial direction of the contact ring, the first drive and guiding means comprising at least one linear ball bearing and an axis arranged inside the bearing configured to provide linearly guided movement of the first contact element of the contact unit;

a second contact holder coupled to the connector body, a third contact element coupled to the second contact holder and configured to make electrical contact to a fourth contact element of a second contact device for the on-load tap changer, and second drive and guiding means coupled to the second contact holder such that the third contact element is movable driven and linearly guided in a second direction away from the connector body that is oblique to the radial direction of the contact ring and that is oblique to the first direction, and the first and second contact holders, the first and third contact elements and the corresponding first and second drive and guiding means being coupled to the connector body such that the first and second directions the corresponding first and third contact elements are movable along enclose a predetermined angle;

a contact device with a contact terminal and a fifth contact element configured to provide power supply due to interaction of the first and third contact elements of the first and second contact units and second and fourth contact elements of the first and second contact devices, wherein the first contact device and the second contact device are configured stationary, and the contact unit is connected to the rotatable contact ring such that each of the first and third contact elements is driven and linearly guided in the direction away from the connector body and towards the respective contact element of the contact device.

14. The on-load tap changer according to claim 13, wherein the second contact element of the first contact device comprises a curved shape and extends along a ring section.

15. The on-load tap changer according to claim 13, wherein the first and third contact elements of the contact unit and the second and fourth contact elements of the first and second contact devices comprise respective contact surfaces configured to face each other along the direction the respective contact element of the contact unit is movable.

16. The on-load tap changer according to claim 13, wherein the first contact element of the contact unit comprises a rotatable roller to make electrical contact to the second contact element of the first contact device for the on-load tap changer.

17. The on-load tap changer according to claim 13, wherein the first contact element of the contact unit comprises a slider to make electrical contact to the second contact element of the first contact device for the on-load tap changer.

18. The on-load tap changer according to claim 13, wherein the first drive and guiding means comprise a spring configured to act a spring force driving the first contact element of the contact unit away from the connector body.

19. The on-load tap changer according to claim 13, wherein the first drive and guiding means comprise a second linear bearing and a second axis arranged inside the second bearing and wherein the first contact element of the contact unit is arranged between the bearings.

* * * * *